United States Patent [19]

Dunn

[11] 4,061,201

[45] Dec. 6, 1977

[54] HYDRAULIC SYSTEM WITH DUAL PUMPS FOR TRACTOR BRAKE, STEERING, AND LOADER VALVES

[75] Inventor: Donnell Lynn Dunn, Terre Haute, Ind.

[73] Assignee: J. I. Case Company, Racine, Wis.

[21] Appl. No.: 718,011

[22] Filed: Aug. 26, 1976

[51] Int. Cl.² ............................................. B62D 5/08
[52] U.S. Cl. ...................................... 180/133; 60/422
[58] Field of Search .................. 180/132, 133; 60/421, 60/422, 428, 430

[56] References Cited

U.S. PATENT DOCUMENTS

| 3,561,327 | 2/1971 | Stremple | 60/422 X |
| 3,847,243 | 11/1974 | Barth | 180/133 |

Primary Examiner—Joseph F. Peters, Jr.
Assistant Examiner—John A. Pekar
Attorney, Agent, or Firm—Arthur J. Hansmann

[57] ABSTRACT

A hydraulic system with dual pumps for tractor brake, steering, and loader valves wherein one of the pumps is connected directly with the tractor brake valve, and the system is arranged to have the hydraulic flow go from the brake valve to a pressure compensating valve which is connected with the steering valve, and the other pump is also connected with the pressure compensating valve and thus with the steering valve. As such, the output of both pumps can be directed to the steering valve and subsequently also to the loader valves which control the earth-handling bucket and clam and the like.

7 Claims, 1 Drawing Figure

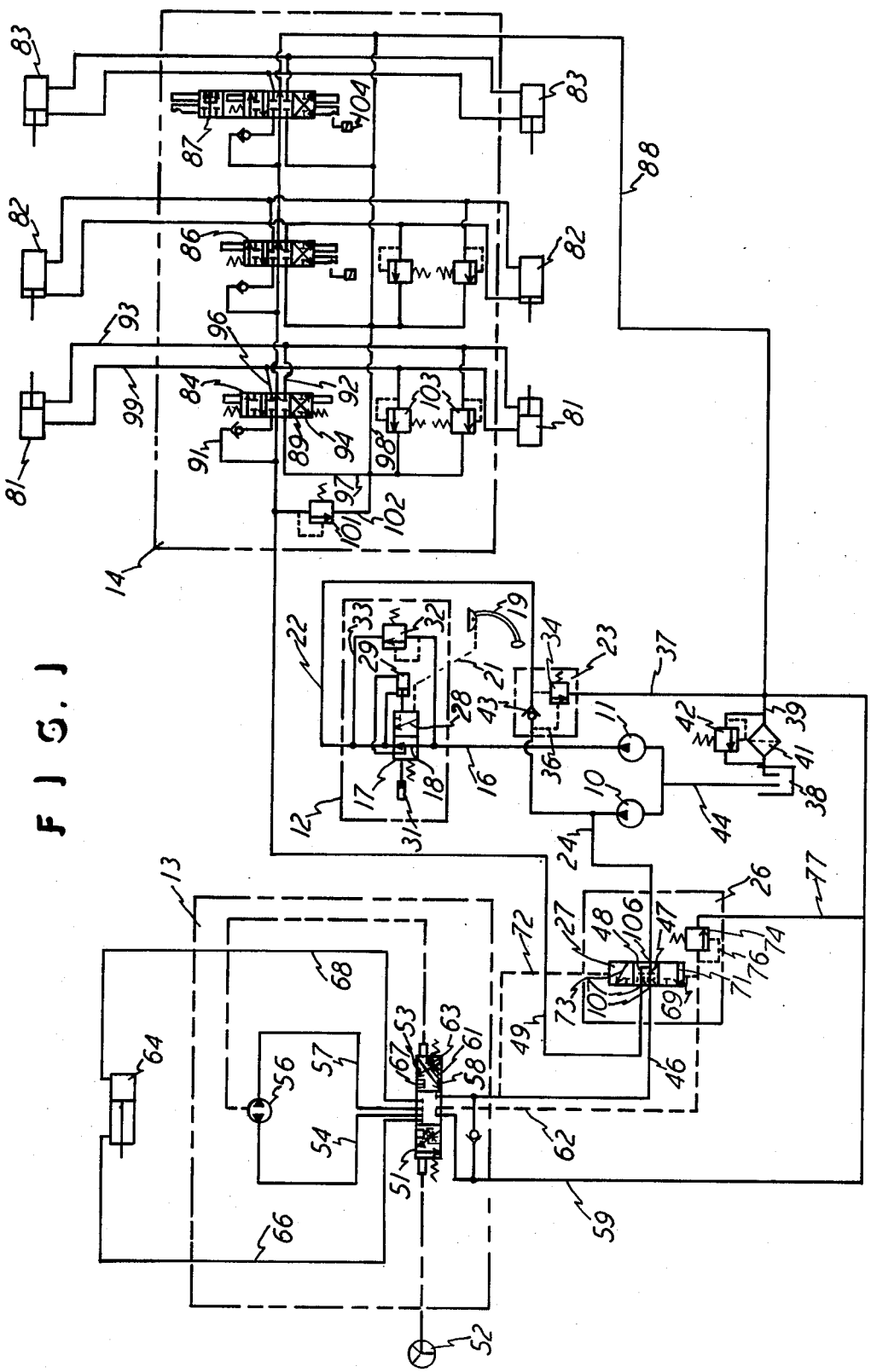

HYDRAULIC SYSTEM WITH DUAL PUMPS FOR TRACTOR BRAKE, STEERING, AND LOADER VALVES

This invention relates to a hydraulic system with dual pumps for tractor brake, steering, and loader valves, and, more particularly, it relates to a hydraulic system wherein the output of both pumps can be combined for supplying hydraulic flow to the steering valve and also to the loader valves which control the loader clam and bucket arrangement.

BACKGROUND OF THE INVENTION

The hydraulic system art is already aware of various arrangements for hydraulic pumps and valves for use in tractors or the like wherein there is hydraulic or power steering and hydraulic or power brakes and also loader valves for controlling the position of earth-handling buckets and clams and the like. Also, the prior art is aware of hydraulic systems which utilize two hydraulic pumps for respectively supplying hydraulic pressure to valves which in turn control hydraulic cylinders or motors or the like, and examples of this type of prior art are found in U.S. Pat. Nos. 3,847,243 and 3,910,044. However, in those examples of prior art, the hydraulic system is not arranged wherein the output of two pumps is combined for supplying the total output of the two pumps to one of the valves for operating one particular powered cylinder or motor or unit. However, the present invention does accomplish the aforementioned in that two hydraulic pumps are provided in the nature of a tandem arrangement wherein one of the pumps can supply a hydraulic valve for accomplishing one of the powered functions in the system, and the output of the two pumps can be combined to supply other valves controlling the flow of hydraulic power to other powered units in the system.

Accordingly, the present invention improves upon the prior art in that it provides a hydraulic system wherein two pumps are incorporated in the system and can be utilized for either individual powerizing of separate valves and powered units, and the system is arranged so that the combined output of the two pumps can be directed to only one of the powered units, as desired. Still further, the aforementioned function of combining the output of the two pumps is automatically achieved in the present invention, by virtue of a pressure compensating valve which is utilized in the present system.

More specifically, the present invention provides a hydraulic system wherein there are power brakes and powered steering valves and also a powered loader valve, but the powered brakes and powered steering valve has priority over the loader valve, but the loader valve has access to the combined or total flow of the dual pumps included in this system. As such, the system always has the priority arrangement wherein the powered brakes and powered steering can be operated, as necessary, and the loader valve does not bleed nor detract from the requirements of the powered brakes and powered steering, until the powered brakes or powered steering are satisfied or are not in use at the moment.

In accordance with the aforementioned functions and improvements over the prior art, the present invention provides the hydraulic system wherein automatic directing of the output of the dual pump system is accomplished, and this is actually achieved through a valve which automatically responds to the pressure conditions at the powered steering valve, such that, when the powered steering valve is in the neutral or low pressure position and thus not demanding high pressure in the system, then the output of the pumps is automatically directed to the loader valve, all as desired.

Still further, the hydraulic system of this invention accomplishes the aforementioned and also incorporates an unloading valve which is available to limit the maximum hydraulic horsepower taken from the prime mover or engine of the tractor or the like. As such, the hydraulic system is properly designed so that the combined output of the two pumps is needed for the loader valve and its speed, but that condition would not allow the tractor transmission sufficient power at a high hydraulic pressure. Accordingly, an unloading valve is incorporated in the system to dump the output of one of the pumps back to the reservoir when the output is above a certain hydraulic pressure, and this allows full hydraulic force with less speed.

Other objects and advantages will become apparent upon reading the following description in light of the accompanying drawings.

BRIEF DESCRIPTION OF THE DRAWINGS

FIG. 1 is a schematic view of the hydraulic system of this invention.

DETAILED DESCRIPTION OF THE PREFERRED EMBODIMENT

The drawing shows the complete hydraulic system of the invention, and it includes the two hydraulic pumps 10 and 11 and the brake booster valve 12 and the power steering valve 13 and the loader valve unit 14. Accordingly, it will be understood that the system can be utilized in a tractor or the like where there are power brakes and power steering and buckets and backhoes and clams or the like are powered by the loader valve 14. As such, the components are readily understandable by anyone skilled in the art, and the arrangement is such that the two hydraulic pumps 10 and 11 can be used in tandem, that is together, for supplying the hydraulic flow to the loader valve 14, when the brake valve 12 passes oil through it, and the steering valve 13 does not require all of the output of the pumps 10 and 11.

In detail, it will be seen that the hydraulic pump 11 is connected with the brake valve 12 through a hydraulic line 16 such that the flow can go into the brake valve spool 17 and can flow therethrough in the passageway 18 so that the valve 12 is in the nature of an open center valve. The valve spool closure 17 is under the control of the usual brake pedal 19 which would of course be connected to the spool in the usual manner and as indicated by the dotted line 21. In the position shown in FIG. 1, flow can go from the pump 11 and through the line 16 and through the valve closure passageway 18 and to the line 22 and around through an unloading valve 23 and to a line 24 which is connected with the line 22 and joins the output of the pump 10. Further, the line 24 extends to a pressure compensating valve 26 which has a shiftable spool 27 described hereinafter. As such, the output of the pump 11 is supplied to the brake valve 12, and the pressure increases when the pedal 19 is depressed, and flow continues to the brake valve 12 and goes to the line 24 and thus joins with the pump 10 and continues to the pressure compensating valve 26, for a reason described later.

The brake valve spool 17 is shiftable, and the spool has another fluid passageway 28 which can be aligned with the incoming hydraulic line 16 to thus connect the booster cylinder 29 which in turn assists in the operation of the valve 12 and thereby operates to pressurize the brake master cylinder 31, all in the usual arrangement. Also, a pressure relief valve 32 is connected in the valve 12 by means of the fluid passageways 33, and thus the relief valve 32 can be set to relieve the excessive pressure in the valve 12, if desired, and this permits the flow to bypass the closure 17 and go to the line 22 and to the hydraulic line 24 connected with the valve 26. Further, the unloading valve 23 is connected in the line 22, and the relief closure 34 is available for sensing the pressure in the line 22, through the pilot line 36, to thus shift the relief valve 23 to the right and thus the open position and thereby connect the line 22 with a line 37 which leads to the reservoir or tank 38 through the interconnecting line 39 and the usual filter 41 and low pressure relief valve 42. At this time it will also be seen that the valve 23 has a check valve 43 which prevents reverse flow, that is flow from the pump 10 and into the line 22. Of course both pumps 10 and 11 are connected with the tank 38, such as through the line 44, and it will also be mentioned that the pump 10 may be a 16-gallon-per-minute capacity while the pump 11 can be an 8-gallon-per-minute capacity.

It will therefore be seen that the smaller capacity pump supplies the brake valve 12 which has priority with respect to the smaller capacity pump 11. Subsequently, the output of the pump 11, when it is not required for the brake 12, joins with the output of the pump 10 and is presented to the pressure compensating valve 26 which then distributes the hydraulic fluid to the steering valve 13 and to the loader valve 14, again with priority going to the steering valve 13.

The valve 26 has its spool 27 of the open center type, and thus the line 24 flow communicates with the line 46 through the spool passageway 47. Also, in the position shown in FIG. 1, the spool 27 has a passageway 48 which connects with a line 49 fluid-flow connected with the loader valve 14, as shown. The steering valve 13 is of a conventional arrangement, and it has its spool 51 which is a closed center type spool or valve, and thus the line 46 deadends in the spool 51 when the spool 51 is in the position shown in FIG. 1. However, upon moving the usual vehicle or tractor steering wheel 52 which is connected with the spool 51, the spool 51 can be shifted both to the left and to the right and thereby connect the several passageways shown on the spool 51 to thus operate the power steering valve unit 13. For instance, if the spool 51 is shifted to the left, as viewed in FIG. 1, then the fluid passageway 53 will flow connect between the line 46 and the line 54 which connects with the booster motor 56 and the line 57 to have the flow return through the spool 51 in the passageway 58 which is then flow connected with the line 59 leading back to the tank 38. Also, in the usual arrangement, the valve 13 has a passageway 61 which interconnects the passageway 53 with a pilot line 62 which is flow connected to the pressure-compensating spool 27. Further, the steering valve 13 has the conventional fluid regulator arrangement at 63. Thus, with the spool 51 shifted to the left, as described above, then the fluid will be presented to the power steering cylinder 64 through the line 66 which is connected with the spool passageway 67 which has then interconnected the lines 54 and 66. Also, the hydraulic line 68 directs the flow back to the spool 51 and then through the passageway 58 and to the return 59, as mentioned.

When the cylinder 64 is under pressure, that is when the power steering valve 13 is operative and demanding power, the pressure compensating valve 26 will sense that demand, through the line 62 and connecting line 69, and that will shift the spool 27 upwardly, as viewed in FIG. 1, to where the spool passageway 71 connects the line 24 with the line 46 to direct all of the flow needed to the steering valve 13, in the priority arrangement. Subsequently, when the valve 13 is not being pressurized, then the spool 27 also senses that, through the pilot line 72, and that causes the spool 27 to shift downwardly to where the spool passageway 73 interconnects the line 24 with the line 49, and then all of the output from the tandem pumps 10 and 11 will be directed to the loader valve 14.

Also, a pressure relief valve 74 is connected with the line 62 and, through its pilot line 76, the valve 74 can shift to the open position to flow connect the line 62 with the line 77 and thus permit the excessive pressure in the steering valve 13 to be directed back to the tank 38.

Accordingly, the steering valve 13, in its schematically-shown arrangement on the spool 51, is arranged to sense the pressure drop at the valve 13 and thus cause the pressure compensating valve 26 to act according to the pressure conditions in the valve 13 such that when there is demand for high pressure, then the valve 26 presents the combined output of the tandem pumps 10 and 11 to the valve 13, and when there is no pressure or low pressure requirement in the valve 13, then the valve 26 senses that condition and interconnects the output of the two pumps 10 and 11 with the line 49 and consequently with the loader valve 14. Thus the passageway 61 shown in the spool 51 senses the pressure in the cylinder 64, to create the upward shifting of the spool 27, as mentioned; and also the line 72 senses the pressure presented to the valve 13 but not thereacross, such as in the FIG. 1 position of valve 13 where there is no demand for fluid pressure, and thus the pressure in the line 72 shifts the spool 27 to the downward position described. Also, the valve 27 is shown to have the arrangement with the passageways 47 and 48, as described, and with the usual flow dividers or restrictors shown therein, so that the flow can be divided between the steering valve 13 and the loader valve 14, when desired.

Finally, the loader valve 14 is of an arrangement which commonly services the usual material-handling clam having its cylinders 81 and the usual material-handling bucket having its usual cylinders 82 and the usual bucket arm support lift cylinders 83. The bucket-clam arrangement is not shown in these drawings, but it will be understood by one skilled in the art that it is of a conventional arrangement and may be as shown in U.S. Pat. No. 2,812,595. That is, the arrangement is such that the material-handling member may be actuated to present and be used as a clam, and it may be actuated to present and be used as a bucket, and of course the member will also be raised and lowered on its support arm, in accordance with the actuation of the lift cylinders 83.

Thus the fluid line 49 connects with the loader valve 14 which is of the open center type and which has the three spools 84 and 86 and 87 respectively actuating the cylinders 81, 82, and 83, and being hydraulically connected therewith as shown in FIG. 1. In the position shown in FIG. 1, the three spools are in the centered and thus open position, and thus the valve 14 is not requiring any hydraulic pressure and the fluid would simply flow therethrough and into the return line 88 and back to the tank 38. However, if any one of the three spools is shifted up or down, then the respective passageway thereof would connect for the pressurizing of the respective hydraulic cylinder 81 or 82 or 83, in the manner shown in the drawing.

The internal arrangement of the loader valve 14 is apparent by the schematic drawing shown, but the following will describe the arrangement with the spool 84, for example. Spool 84 is shown in the open center position so that the flow will pass through and onto the spools 86 and 87 and to the tank return line 88, as mentioned. However, if under the manual control available to the operator for shifting the spool 84 up and down, the spool is shifted upwardly, then the spool passageway 89 will connect with the line 91 and present fluid flow to the line 92 which in turn is connected with the line 93 leading to the rod end of the hydraulic cylinders 81, as shown. Also, the spool has a passageway 94 which is then connected between the line 96 and the line 97 which connects with the line 98 to lead to the tank return line 88, as shown. Therefore, the return flow from the head end of the cylinders 81 is presented to the line 99 which is connected with that line 96 for the return to the tank 38, as mentioned.

Conversely, if the spool 84 is shifted downwardly, then the two passageways shown in the upper end of the spool 84 will be respectively connect with the lines 91 and 92, for pressurizing the head end of the cylinders 81 while exhausting the rod end of the cylinders 81. Also, a main relief valve 101 is connected with the line 49, and, through a line 102, the valve 101 connects with the return lines 97 and ultimately connects with the tank return line 88, as shown. Still further, additionally relief valves 103 are included in the loader valve 14, for the connection and purpose apparent to one skilled in the art and to actually limit the pressure presented to either end of the respective cylinder 81, 82, and 83. The spool 87 is shown to be a four-position float spool, and the usual magnetic detents 104 are interconnected with the spools 86 and 87 for retaining them in the desired set positions. In this arrangement, the main relief valve 101 may have a pressure of say 2500 psi, and the filter by-pass valve 42 may have a low pressure of 25 psi, and the unloading valve 23 may have a value of a pressure of 1800 psi and the brake fluid pressure may be limited to 1500 psi, and the compensating valve 26 includes the relief valve 74 which limits the hydraulic pressure in the steering valve 13, as desired. Also, the compensating valve 26 senses the load pressure at the steering valve 13, as mentioned, and it sets the pump pressure at approximately 100 psi above that load pressure. As such, the pressure compensating valve 26 has a single hydraulic inlet 106 and two hydraulic inlet 106 and two hydraulic outlets 107 which are respectively connected with the steering valve 13 and the loader valve 14, as shown and as described herein. Also, as mentioned, the relief value for the pressure relief valve of the brake valve 12 is of a lower value than that of the relief valve connected with the pressure compensating valve 26 controlling the pressure in the steering valve 13.

Supplemental to, and in addition to, the advantages, objectives, features, and improvements mentioned in all of the foregoing, the present invention provides the following:

1. A hydraulic system which has the ability to supply large quantities of hydraulic fluid to the steering valve, even at low prime mover or engine speeds, thereby insuring good steering response at those low speeds.

2. A hydraulic system with the ability to provide fast hydraulic drive speeds and high hydraulic forces and high tractive forces at the wheels of a vehicle, for instance, while utilizing only a small prime mover or engine, compared to the engine size required when utilizing the hydraulic systems of the prior art, and, like the aforementioned point, this is an energy-saving feature.

3. Utilizing and combining, into one hydraulic system, the pressure compensating and hydraulic pump unloading features mentioned herein.

4. Utilizing and combining, in one hydraulic system, an open center valving and a closed center valving, as mentioned herein.

What is claimed is:

1. A hydraulic system with dual pumps for tractor brake, steering, and loader valves, comprising two hydraulic pumps, a hydraulic brake valve having a hydraulic flow-through passageway leading into and out of said brake valve and being hydraulically connected with one of said pumps, a pressure compensating valve having a hydraulic inlet and two hydraulic outlets, a hydraulic connection hydraulically interconnected between the other of said pumps and said pressure compensating valve inlet, an additional hydraulic connection interconnecting the outlet side of said brake valve flow-through passageway and the first mentioned hydraulic connection interconnecting the other of said pumps and said pressure compensating valve inlet for hydraulic flow from said brake valve and said other pump to said pressure compensating valve and thereby direct the flow of both said pumps to said pressure compensating valve, a hydraulic steering valve hydraulically connected with one of said outlets of said pressure compensating valve, a hydraulic pilot line hydraulically connected between said steering valve and said pressure compensating valve for hydraulically setting the latter in accordance with hydraulic pressure in said steering valve for directing hydraulic flow relative to said two outlets, and a loader valve hydraulically connected with the other of said outlets of said pressure compensating valve for receiving hydraulic flow from said pressure compensating valve.

2. The hydraulic system with dual pumps for tractor brake, steering, and loader valves, as claimed in claim 1, including a hydraulic pressure relief valve hydraulically connected with each of said brake valve and said pressure compensating valve, said relief valves having pressure relief values wherein said relief valve connected with said brake valve is of a lower relief pressure than that of said relief valve connected with said pressure compensating valve.

3. The hydraulic system with dual pumps for tractor brake, steering, and loader valves as claimed in claim 2, including a check valve hydraulically connected between said other pump and said lower pressure relief valve for said brake valve, for preventing flow from said other pump and to said lower pressure relief valve.

4. The hydraulic system with dual pumps for tractor brake, steering, and loader valves as claimed in claim 1, wherein said other pump is of a pumping capacity greater than that of said one pump, for supplying adequate hydraulic flow to said pressure compensating valve.

5. The hydraulic system with dual pumps for tractor brake, steering, and loader valves as claimed in claim 1, wherein said loader valve includes a plurality of separate valve sections, a hydraulic cylinder for each of said valve sections, and each of said valve sections having respective hydraulic connections with said cylinders for directing hydraulic flow to said cylinders.

6. The hydraulic system with dual pumps for tractor brake, steering, and loader valves as claimed in claim 1, wherein said steering valve is a closed center type having a center-neutral position and which does not allow flow of hydraulic fluid when said steering valve is in the neutral position.

7. The hydraulic system with dual pumps for tractor brake, steering, and loader valves as claimed in claim 6, wherein said loader valve is an open center type having a center-open position and which allows flow of hydraulic fluid therethrough when said loader valve is in the center-open position.

* * * * *